US011373106B2

(12) United States Patent
Chavan et al.

(10) Patent No.: US 11,373,106 B2
(45) Date of Patent: Jun. 28, 2022

(54) SYSTEM AND METHOD FOR DETECTING FRICTION IN WEBSITES

(71) Applicant: Fractal Analytics Private Limited, Mumbai (IN)

(72) Inventors: Onil Chavan, Piscataway, NJ (US); Arpan Dasgupta, Jersey city, NJ (US); Karan Gusani, San Antonio, TX (US); Nishant Sinha, Jersey City, NJ (US)

(73) Assignee: Fractal Analytics Private Limited, Mumbai (IN)

( * ) Notice: Subject to any disclaimer, the term of this patent is extended or adjusted under 35 U.S.C. 154(b) by 0 days.

(21) Appl. No.: 16/793,553

(22) Filed: Feb. 18, 2020

(65) Prior Publication Data

US 2021/0158187 A1   May 27, 2021

(51) Int. Cl.
| | |
|---|---|
| G06N 5/04 | (2006.01) |
| G06F 16/958 | (2019.01) |
| G06N 20/00 | (2019.01) |
| G06F 40/279 | (2020.01) |
| G06F 40/30 | (2020.01) |
| G06Q 30/02 | (2012.01) |
| G06V 10/98 | (2022.01) |
| G06V 30/416 | (2022.01) |
| G06Q 30/00 | (2012.01) |

(Continued)

(52) U.S. Cl.
CPC ............ *G06N 5/04* (2013.01); *G06F 16/958* (2019.01); *G06F 40/279* (2020.01); *G06F 40/30* (2020.01); *G06K 9/6215* (2013.01); *G06K 9/6256* (2013.01); *G06N 20/00* (2019.01); *G06Q 30/0201* (2013.01); *G06V 10/98* (2022.01); *G06V 30/414* (2022.01); *G06V 30/416* (2022.01); *G06Q 30/016* (2013.01); *G06V 30/10* (2022.01)

(58) Field of Classification Search
CPC ........ G06N 5/04; G06N 20/00; G06F 16/958; G06F 40/279; G06F 40/30; G06Q 30/0201; G06Q 30/016; G06V 30/416; G06V 10/98; G06V 30/10
See application file for complete search history.

(56) References Cited

U.S. PATENT DOCUMENTS

| | | |
|---|---|---|
| 5,555,403 A | 9/1996 | Cambot |
| 7,065,707 B2 | 6/2006 | Chen |
| (Continued) | | |

OTHER PUBLICATIONS

Jabeen, Saima, and Alessandro Fiori. Document analysis by means of data mining techniques. Lap Lambert Academic Publishing, 2015. (Year: 2015).*

(Continued)

*Primary Examiner* — Li B. Zhen
*Assistant Examiner* — Markus A. Vasquez
(74) *Attorney, Agent, or Firm* — Wiley Rein LLP

(57) ABSTRACT

System and method of detecting friction in a website comprising a plurality of webpages and links includes a database sever, an application executed by a processor, and a management dashboard. The application extracts text data and web usage data from the website, segments the website into three funnel stages, identifies an anomaly in the web usage data, quantifies the impacts of the webpages and links, identifies the friction and the underlying root cause, and displays the friction in the management dashboard.

14 Claims, 7 Drawing Sheets

(51) Int. Cl.
*G06V 30/10* (2022.01)
*G06K 9/62* (2022.01)
*G06V 30/414* (2022.01)

(56) References Cited

U.S. PATENT DOCUMENTS

| | | | | |
|---|---|---|---|---|
| 2008/0270164 | A1* | 10/2008 | Kidder | G06Q 30/0241 |
| | | | | 705/14.4 |
| 2015/0371239 | A1* | 12/2015 | Hoyne | G06Q 30/0201 |
| | | | | 705/7.29 |
| 2016/0078388 | A1* | 3/2016 | Himmelreich | H04L 12/1407 |
| | | | | 709/224 |
| 2017/0094058 | A1* | 3/2017 | Piaggio | H04M 3/5141 |
| 2017/0285755 | A1* | 10/2017 | Churchill | G06F 3/0481 |
| 2018/0308123 | A1* | 10/2018 | Zhong | G06Q 30/0273 |
| 2019/0087764 | A1* | 3/2019 | Bhushanam | G06F 16/95 |

OTHER PUBLICATIONS

Allahyari, Mehdi, et al. "A brief survey of text mining: Classification, clustering and extraction techniques." arXiv preprint arXiv: 1707.02919 (2017). (Year: 2017).*

Lemon, Katherine N., and Peter C. Verhoef. "Understanding customer experience throughout the customer journey." Journal of marketing 80.6 (2016): 69-96. (Year: 2016).*

Meusel, Robert, et al., The Graph Structure in the Web-Analyzed on Different Aggregation Levels, The Journal of Web Science 1.1 (2015).

Singh, Ashishkumar, et al., Clustering Experiments on Big Transaction Data for Market Segmentation, Proceedings of the 2014 International Conference on Big Data Science and Computing. ACM, 2014.

* cited by examiner

SYSTEM AND METHOD FOR DETECTING FRICTION IN WEBSITES

RELATED APPLICATIONS

This application claims priority benefit of Indian Patent Application No. 201921047654, filed Nov. 21, 2019, which are incorporated entirely by reference herein for all purposes.

FIELD OF THE INVENTION

The disclosure relates generally to systems and methods for identifying and reducing friction from customer experience on a website. More particularly, the present invention concerns systems and methods that identify potential errors, bottlenecks, and other difficulties (hereinafter referred to as "friction") that discourage user interaction with websites so that those friction issues may be reduced and/or eliminated.

DESCRIPTION OF THE RELATED ART

A website is a collection of webpages connected to each other using links and sub-links. The performance of a website directly impacts its success or failure in serving its objective. The impact of web performance on business success has been demonstrated many times in the real world. When prospective customers arrive at a website, they come with a specific intention or motivation of making a purchase, or come to browse out of curiosity or by mistake. For those prospects, it is the efficacy of the website's purchase funnel, i.e. the pages that make up the buying process, that determines whether the visitor becomes a customer or merely a statistic.

Among the factors that influence the probability of conversion, an element referred to as friction is key for marketers. The reason is that, unlike motivation or the product factors of value proposition, friction is something that can be significantly influenced with comparatively little energy or cost; and the conversion gains received can be disproportionately high compared with the level of investment.

As a web sites may contain tens, hundreds, thousands, or more different web pages and hyperlinks, it has become increasingly expensive to quickly and correctly identify friction in a website. Artificial intelligence and machine learning (AIML) may provide a solution for quick detection of friction in a website. AIML involves computer technology that is able to perceive, process and take action based on varying real-world factors. AIML is capable of recognizing, classifying and reacting to various objects, strings of texts, sounds, and other sub-media within a given medium. A desire has arisen, therefore, for systems and methods that address one or more of the deficiencies identified herein using AIML technology.

SUMMARY OF THE INVENTION

In view of the foregoing, the present invention provides for a system and method for detecting friction in a website comprising a plurality of webpages and links connecting the webpages. The object of the present invention is to quickly detect friction in a website thus allow correction in a timely fashion.

One exemplary embodiment of the invention herein provides a system for detecting friction in a website comprising a plurality of webpages and links connecting the webpages, comprising:

a computer readable storage device having stored thereon:

a first instruction executable by a database sever to extract text data and web usage data from the website and develop a semantic layer to store and organize the text data and the web usage data;

a second instruction executable by a processor to segment the website into a plurality of funnel stages to generate a hierarchy data of the webpages;

a third instruction executable by a processor to detect an anomaly in the web usage data and map the anomaly within the funnel stages;

a fourth instruction executable by a processor to calculate magnitude and direction of an impact of each webpage at each funnel stage via artificial intelligence algorithms based on the web usage data and the hierarchy data of the webpages, wherein the artificial intelligence algorithms comprise a first algorithm configured to identify which webpage from each funnel stage drives positive or negative impact on conversion and a second algorithm configured to quantify relative impact of each webpage towards conversion;

a fifth instruction executable by a processor calculate magnitude and direction of an impact of each link clicked for each webpage at each funnel stage via artificial intelligence algorithms based on the web usage data and the hierarchy data of the webpages, wherein the artificial intelligence algorithms comprise the first algorithm configured to identify which link from each funnel stage drives positive or negative impact on conversion and the second algorithm configured to quantify relative impact of each link towards conversion;

a sixth instruction executable by a processor calculate magnitude and direction of an impact of each sub link clicked for each webpage at each funnel stage via artificial intelligence algorithms based on the web usage data and the hierarchy data of the webpages, wherein the artificial intelligence algorithms comprise the first algorithm configured to identify which sub link from each funnel stage drives positive or negative impact on conversion and the second algorithm configured to quantify relative impact of each sub link towards conversion; and a seventh instruction executable by a processor to identify a root cause underlying the anomaly via text mining algorithms based on the text data.

In another embodiment, the computer readable storage device further has stored thereon: an eighth instruction executable by a processor to display the friction in a management dashboard.

In at least one embodiment, the funnel stages comprise an upper stage, a middle stage, and a lower stage. The text data comprise chat transcripts and call transcripts. The web usage data comprise page visited, number of page views, number of unique users, browser and operating system information, user's website view pattern, widely viewed pages, clicked links, time of interactions, user characteristics, browser and operating system information. The text data is extracted using natural language processing (NLP) algorithms.

In at least one embodiment, the first instruction extracts more than 1000 machine-readable sensors.

In at least one embodiment, the third algorithm to identify a root cause underlying the anomaly comprises text mining algorithms selected from a group consisting of K-means Clustering, Naïve Bayes Classifier, K-Nearest Neighbor (KNN), Support Vector Machines (SVM), Decision Tree, Generalized Linear Models (GLM), Neural Networks, Associations Rules, Generic Algorithms, and Latent Dirichlet Allocation.

Another exemplary embodiment of the invention herein provides a method for identifying friction in a website having a plurality of webpages and links between the webpages, comprising:

extracting, via a database sever, text data and web usage data from the website and developing a semantic layer to store and organize the text data and the web usage data;

segmenting, via a processor, the website into a plurality of funnel stages to generate a hierarchy data of the webpages;

detecting, via a processor, an anomaly in the web usage data and mapping the anomaly within the funnel stages;

calculating, via a processor, magnitude and direction of an impact of each webpage at each funnel stage via artificial intelligence algorithms based on the web usage data and the hierarchy data of the webpages, wherein the artificial intelligence algorithms comprise a first algorithm configured to identify which webpage from each funnel stage drives positive or negative impact on conversion and a second algorithm configured to quantify relative impact of each webpage towards conversion;

calculating, via a processor, magnitude and direction of an impact of each link clicked for each webpage at each funnel stage via artificial intelligence algorithms based on the web usage data and the hierarchy data of the webpages, wherein the artificial intelligence algorithms comprise the first algorithm configured to identify which link from each funnel stage drives positive or negative impact on conversion and the second algorithm configured to quantify relative impact of each link towards conversion;

calculating, via a processor, magnitude and direction of an impact of each sub link clicked for each webpage at each funnel stage via artificial intelligence algorithms based on the web usage data and the hierarchy data of the webpages, wherein the artificial intelligence algorithms comprise the first algorithm configured to identify which sub link from each funnel stage drives positive or negative impact on conversion and the second algorithm configured to quantify relative impact of each sub link towards conversion; and running, via a processor, a third algorithm to identify a root cause underlying the anomaly.

Further details of these and other aspects of the subject matter of the present invention will be apparent from the detailed description and drawings included below.

BRIEF DESCRIPTION OF THE DRAWINGS

Reference is now made to the accompanying drawings, in which.

DETAILED DESCRIPTION OF EMBODIMENT(S) OF THE INVENTION

Figure 1:
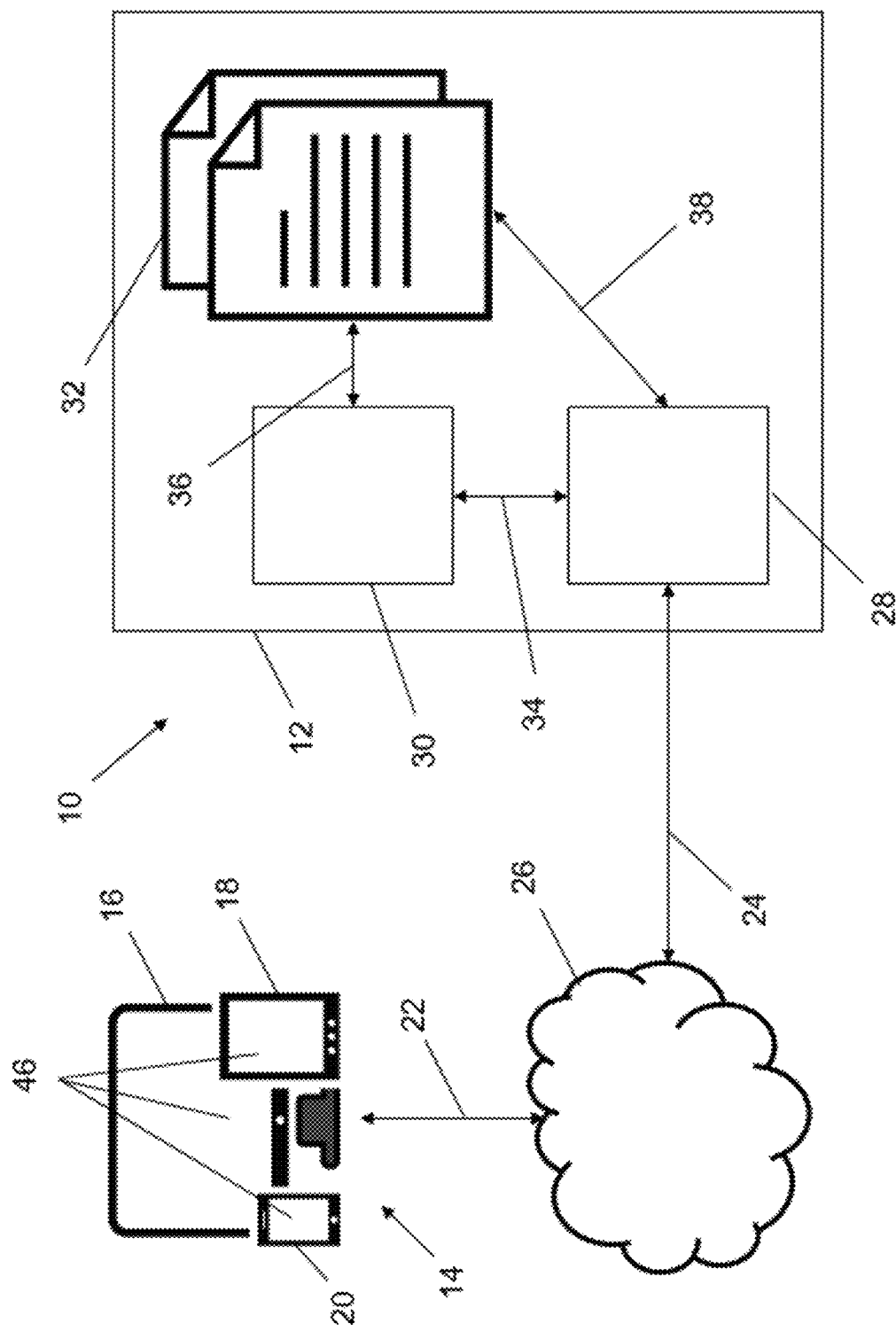
FIG. 1 is a graphical representation of one contemplated system according to the present invention.

One or more embodiments are described in connection with the present invention. The embodiments are intended to illustrate the breadth and scope of the present invention rather than to limit the scope thereof.

The present invention will now be described in connection with hardware elements and software elements. Hardware elements are contemplated to be physical devices, such as computer terminals, mobile devices, servers, routers, processors, and the like. Software elements are contemplated to encompass one or more instruction sets that may be executed on or by a hardware element. It is noted, however, that hardware elements may be embodied in software and, conversely, that software elements may be embodied in hardware. Accordingly, any reference to an element of the present invention as one of either hardware or software should not be understood to limit the scope of the present invention to the designation so made.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used in the specification and appended claims, unless specified to the contrary, the following terms have the meaning indicated below.

A "friction" point is defined as a deficiency in the website that discourages a user from moving from one stage of the website to the next stage of the website, the details of which are clarified in the paragraphs that follow. Without limiting the present invention, a friction point may be an error in the website, such as a defective link, an absence of information, long page loading times, confusing navigation, difficult-to-understand functionality of content, jumbled interfaces, inability to achieve a task, ineffective copy, complicated forms, or the like.

The terms "purchase" and "sell," and their derivatives, are not limited to transactions that involve a transfer of ownership of the item being purchased or sold, but rather also encompasses rentals, licenses and leases of items.

The term "natural language processing (NLP)" is a field of computer science, artificial intelligence and linguistics concerned with the interactions between computers and human (natural) languages. Specifically, it is the process of a computer extracting meaningful information from natural language input and/or producing natural language output.

The term "semantic layer" is a business representation of corporate data that helps end users access data autonomously using common business terms. A semantic layer maps complex data into familiar business terms such as product, customer, or revenue to offer a unified, consolidated view of data across the organization.

The term "K-means Clustering" refers to a data analysis algorithm that aims to find groups in given data set. The number of groups is represented by a variable called K. The key idea is to define k centroids which are used to label new data.

The term "Naïve Bayes Classifier" refers to simple probabilistic algorithm for the classification tasks. The Naïve Bayes Classifier is based on the so-called Bayesian theorem and gives great and reliable results when it is used for text data analytics.

The term "K-Nearest Neighbor (KNN)" refers to text mining algorithms stores all existing data objects and classifies the new data objects based on a similarity measure. KNN is a non-parametric method for classification. In the text analysis domain, KNN is used to check the similarity between documents and k training data. The aim is to determine the category of the test documents.

The term "Support Vector Machines (SVM)" refer to a supervised machine learning algorithm mainly used for classification problems and outliers detections. It can be also used for regression challenges. SVM is used to sort two data sets by similar classification. This data analysis algorithm draw lines (known as hyperplanes) that separate the groups according to some patterns.

The term "Decision Tree algorithm" refers to a machine learning technique for data mining that creates classification or regression models in the shape of a tree structure. The structure includes a root node, branches, and leaf nodes. Each internal node indicates a test on an attribute and each branch indicates the result of a test. Finally, each leaf node indicates a class label.

The term "Generalized Linear Models (GLM)" refers to a popular statistical technique used for linear modeling. GLMs combine a large number of models including linear regression models, logistic regression, Poisson regression, ANOVA, log-linear models and etc. Combining the linear approach with data mining tools has many advantages such as accelerating the modeling process and achieving better accuracy.

The term "Association rules" refers to just if/then statements that aim to uncover some relationships between unrelated data in a given database. They can find relationships between the items which are regularly used together. Popular applications of association rules are basket data analysis, cross-marketing, clustering, classification, catalog design, etc.

The term "Genetic algorithms (GAs)" refers to a family of stochastic search algorithms witch mechanism is inspired by the process of neo-Darwinian evolution. GAs have applied binary strings (chromosomes) to encode the features that form an individual. They basically try to imitate the human evolution. GAs can solve several text data mining problems such as clustering, the discovery of classification rules, attribute selection and construction.

The term "Latent Dirichlet Allocation (LDA)" refers to a generative probabilistic model designed for collections of discrete data. LDA is a method that automatically finds topics that given documents contain.

The term "key performance indicators (KPIs)" refers to a measurable value that demonstrates how effectively a company is achieving key business objectives.

The term "link" refers to a root level link or link on the top level (same level as website home page); the term "sub link" refers to dropdowns, folders, blogs and the like that enable to add a second level of content on a website. The content items added under/within dropdowns, folders, or blogs are called Sub-Links. They are accessible one-level down from the site's primary navigation.

The present invention is contemplated to encompass a system and a method that analyzes data collected in connection with the operation of a website. In particular, data is collected about aspects of the pages displayed for the website. In addition, data is collected about actions taken by users while visiting a website. The data collected is then processed by one or more algorithms to identify "friction" points that exist as users interact with the website.

To facilitate an understanding of the meaning of a friction point, the present invention will now be described in connection with a website designed to facilitate the purchase of products by a user. It should be understood, however, that the present invention is not limited to application to websites designed for the sale of products. The present invention may be applied to any type of website, as should be apparent to those skilled in the art and as will be made apparent from the discussion that follows.

An online website may comprise a plurality of webpages and hyperlinks or sub-hyperlinks connecting the webpages. The website may provide functionality for users to browse and make purchases from an electronic catalog of items and like. The items represented in the electronic catalog may, for example, include new and/or used physical products that are shipped to customers, digital products that are transferred electronically to customers, subscriptions, tickets for travel and entertainment events, services, and/or other types of items that can be purchased online. These items may be offered for sale on the online sales site by a single business entity (e.g., a retail merchant) or a collection of business entities. Each such item may be described in the electronic catalog by a corresponding item detail page that provides functionality for ordering the item. The website provides data source to the present invention.

FIG. 1 illustrates a contemplated component arrangement of a system 10 for detecting friction and the root cause of the friction in an online website according to one contemplated embodiment of the present invention.

The system 10 encompasses an arrangement of components that permit a user to access a website 12 via a device 14, such as a computer terminal 16, a tablet 18, and/or a mobile phone 20, among others. The device 14 is contemplated to include both an input device to receive input from a user and a display 46 to display output to a user. Aspects of the input and display are known to those skilled in the art and include, but are not limited to, an interactive touch screen display.

The device 14 connects to the website via one or more communication lines 22, 24. The communication lines 22, 24 connect to a network 26, including, but not limited to the Internet.

The website 12 includes webpages 32 and has access to a processor 28 and a database server 30. The webpages 32, processor 28, and database server 30 are interconnected via one or more communication lines 34, 36, 38.

With continued reference to FIG. 1, the illustration of the system 10 is merely representative of one contemplated arrangement of components, features, and assets. The illustration is not intended to limit the scope of the present invention. While the processor 28, the database server 30, and the webpages 32 are shown as being part of the website 12, the processor 28, the database server 30, and the webpages 32 need not be disposed at the same physical location. Instead, FIG. 1 is intended to show that the processor 28, the database server 30, and the webpages 32 are accessible by one another. One or more of the processors 28, the database server 30, and the webpages 32 may be physically disposed at different locations, as should be apparent to those skilled in the art.

Figure 2:
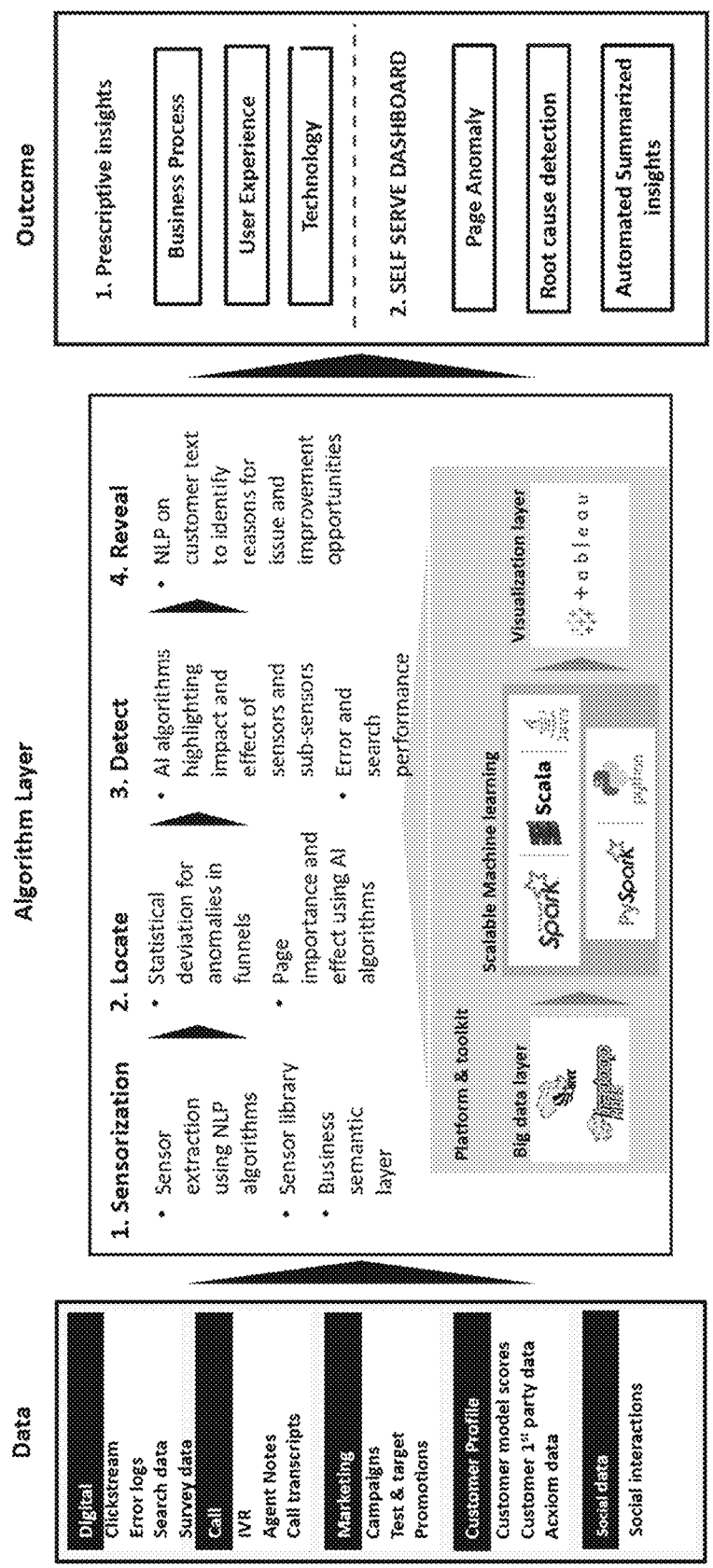
FIG. 2 is a graphical representation of the architecture of the system for identifying friction and the root cause of the friction in an online website.

FIG. 2 illustrates the architecture of the system for identifying friction and the root cause of the friction in an online website, in accordance with one embodiment of the invention. The system is situated in the back-end management side of the website.

In the embodiment depicted in FIG. 2, the system contains a database server, an application executable by a processor, and a management dashboard. The database server fetches text data and web usage data derived from the online website. The text data comprise chat transcripts and call transcripts, including, but not limited to, interactive voice response (IVR) and agent notes. The web usage data reflects the user access patterns with the website, including, but not limited to, pages visited, number of page views, number of unique users, browser and operating system information, user's website view pattern, widely viewed pages, clicked links, time of interactions, user characteristics, browser and operating system information. The web usage data may include common website key performance indicators (KPIs), including but not limited to bounce rate, unique website visitors, pages viewed per session, average time on page, top landing pages, top exit pages, goals and event completions, onsite search queries, and conversion rate.

In the embodiment shown in FIG. 2, the application contains an executable data mining instruction that extract and analyze the text data and web usage data from the website. The text data is analyzed using natural language processing (NLP) algorithms. Web usage data typically involves tracking browsing activities using a variety of measures such as individual mouse clicks and time spent on a portion of a webpage in order to have a user's browsing footprint available at the web server. The web usage data used may be collected, for example, by logfile analysis on a web server or page tagging techniques. The web database server records all their transactions in a log file, and these log files can be read to provide data about the user patterns.

The data mining instruction extracts more than 1000 machine-readable sensors. These sensors have been extracted from the web activity, chat transcripts, search key words, errors encountered in session etc.

Figure 3:
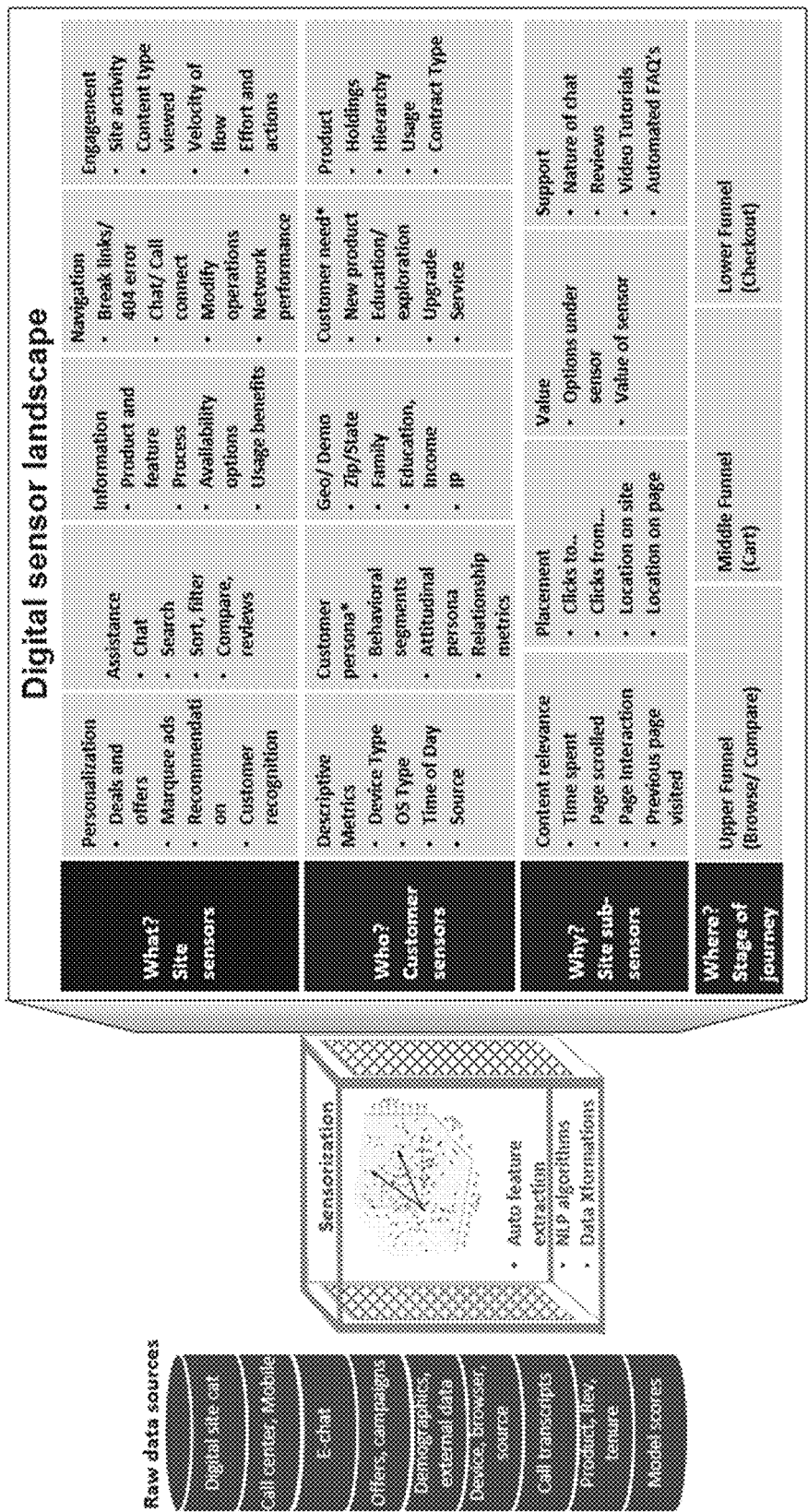
FIG. 3 is a graphical representation of the business semantic layer for the sensor library.

The extracted sensors, called sensor data, is stored in a sensor library. The sensor library may be implemented by a big data platform, such as Hadoop based enterprise data warehouse. The semantic layer provides an intermediate level that represents the underlying data to the end-user in easy to understand business terms. The semantic layer allow information systems end-users to access (query) database systems such as relational databases without knowing the relational structure or the SQL language. See U.S. Pat. No. 5,555,403. This sensor data is grouped into classes and subclasses based on common business terms or business objects exemplified as shown in FIG. 3.

The application comprises an executable hierarchical segmentation instruction to segment the website into three funnel stages hierarchy, including upper, middle and lower stages. The hierarchical arrangement of the web pages in the website may be decided according to the nature of a business transaction. For example, an online shopping website may be segmented into three funnel stages: the upper stage comprises "browse to cart" pages; the middle stage comprises "add to cart" pages and the lower stage comprises "checkout" pages. The techniques used to attempt webpage segmentations may involve simple rule-based heuristics. The heuristics typically utilize several features present on a webpage, and apply the rules in a greedy fashion to produce the segments. Specifically, a function-based object model (FOM) for website segmentation may be applied. The FOM attempts to understand an author's intention that underlies a website. It does so by identifying and using object functions and categories. The FOM includes two complementary aspects: a so-called Basic FOM and a Specific FOM. The basic FOM represents an object by its basic functional properties, and the specific FOM represents an object by its category. Combining the Basic FOM and the Specific FOM together, a thorough understanding of an author's intention regarding a website can be ascertained. FOM provides two level guidelines for web content adaptation: general rules based on Basic FOM, and specific rules based on Specific FOM. Through the rule-based approach, a website can thus be automatically segmented in a manner that preserves, to a desirable degree, the author's original intention with respect to the website. See U.S. Pat. No. 7,065,707.

Figure 4:
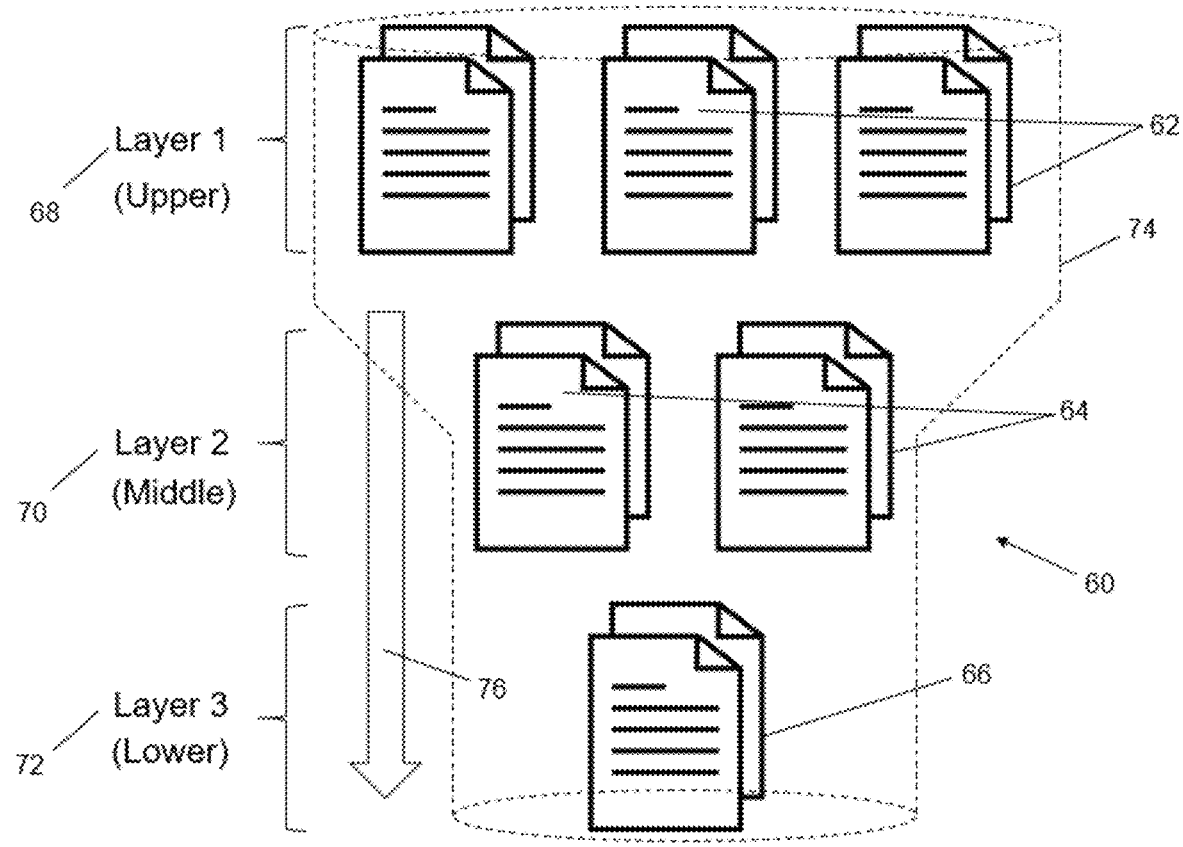
FIG. 4 is a graphical representation of one contemplated hierarchy employed as a part of the system of the present invention.

FIG. 4 is a graphical representation of one organizational hierarchy 60 contemplated for the website 12. As illustrated, the website is divided into a plurality of first pages 62, a plurality of second pages 64, and a plurality of third pages 66. The pages 62, 64, 66 are grouped, respectively, into a first layer 68, a second layer 70, and a third layer 72. The layers 68, 70, 72 are arranged to form a virtual funnel 74 that directs the user from the informational pages (e.g., the first plurality of pages 62 in the first layer 68) to the final page(s) (e.g., the third plurality of pages 66 in the third layer 72), which involve processing of payment information to complete the financial transaction. While the user may navigate between the layers 68, 70, 72 in either an "up" or "down" direction, the funnel 74 is designed to direct the user, in the direction of the arrow 76, to the final purchase stage, which is represented by the third layer 72. Being arranged in this manner, the layers 68, 70, 72 are organized in a hierarchical manner from the introductory initial layer (e.g., the first layer 68) to the final layer (e.g., the third layer 72).

With continued reference to FIG. 4, it is noted that the present invention is discussed in connection with a hierarchy 60 including three layers 68, 70, 72. The present invention, however, is not intended to be limited solely to this arrangement. The present invention is intended to encompass any number of pages 62, 64, 66 and any number of layers 68, 70, 72.

When a user first encounters a website, the user is presented with the first layer 68 of information. The first layer 68 may encompass, for example, one or more pages 62 that provide general information about different products offered for sale through the website 12. For purposes of the instant example, the first layer 68 may relate to different mobile devices 20 that are offered for sale. If the user selects one of the mobile devices 20 presented by the pages 62 in the first layer 68, the user may be directed to the pages 64 in the second layer 70. The pages 64 in the second layer 70 may provide, for example, information about the plans, device protection, accessories, or carriers (i.e., telecommunication companies) that offer service for the selected mobile device 20. After the user selects a carrier, the user may be directed to the pages 66 in the third layer 72. This third layer 72 is contemplated to involve pages 66 where the user's personal information and payment information are collected.

As also indicated in FIG. 4, the first layer 68 is referred to as the upper funnel stage. The second layer 70 is referred to as the middle funnel stage. The third layer 72 is referred to as the lower funnel stage. These appellations are consistent with the direction 76 of flow through the funnel 74 in the hierarchy 60. These appellations are not intended to limit the scope of the present invention.

Embodiments of the system typically include an executable instruction to detect an anomaly in the web usage data and map the anomaly within the level hierarchy of a website. The web usage data, including all major KPIs, are collected over time and statistically assessed to identify trends and anomalies based on statistical deviation. The identification module may use algorithms, such as probabilistic latent semantic analysis (PLSA), K-means, self-organizing maps, and such similar techniques for identification. The web usage data can be made and visualized periodically (the period depending upon business preference) with the most recent website visits and made in the past as inputs. The periodic usage data and visualization can be used to monitor evolution of the key attributes over time and identify anomalies. In an embodiment of the invention, the most nearest existing web usage data is identified. Thus, by comparing the recent data with the existing set of data over a period of time, anomalies can be identified. The identified anomaly may be mapped to classes and subclasses in the digital sensor library as shown in FIG. 3.

For example, all major KPIs in an online shopping website are functioning normally except for the digital conversion rate has fallen compared to historical norms. The conversion rate, also a percentage, is the rate at which users on an ecommerce site are converting (or buying). This is calculated by dividing the total number of conversions by the total number of visitors (to a site, page, category, or selection of pages). All web usage data is compared in time and the anomalies are mapped and located in the middle funnel of the website, the section where customers have made an action to buy, e.g. adding to cart or requesting a quote.

Embodiments of the system typically include an executable instruction to calculate magnitude and direction of an impact of each webpage and link/sub link at each funnel stage using artificial intelligence (AI) algorithms. The proprietary AI algorithms are trained with high quality labeled training datasets, for example, Webpages from Common Crawl 2012 (Meusel, Robert, et al., The Graph Structure in the Web-Analyzed on Different Aggregation Levels, *The Journal of Web Science* 1.1 (2015)), or Online Retail Dataset (Singh, Ashishkumar, et al., Clustering Experiments on Big Transaction Data for Market Segmentation, *Proceedings of the* 2014 *International Conference on Big Data Science and Computing*. ACM, 2014). The input of the AI models are the sensor data in the business semantic layer of the system as shown in FIG. 3. The first algorithm is configured to identify which webpage, link or sub link from each funnel stage drives positive or negative impact on conversion. The second algorithm is configured to quantify relative impact of each page, link or sub link towards conversion, both these two AI algorithms run for each funnel stage. The output of the AI algorithms is to identify the top pages, links, or sub links which have negative impact and have highest impact on conversion. The first AI algorithm may comprise Logistic algorithm to provide the direction (positive or negative impact on conversion) and the second algorithm may comprise Random forest algorithm to calculate the impact.

Figure 5:
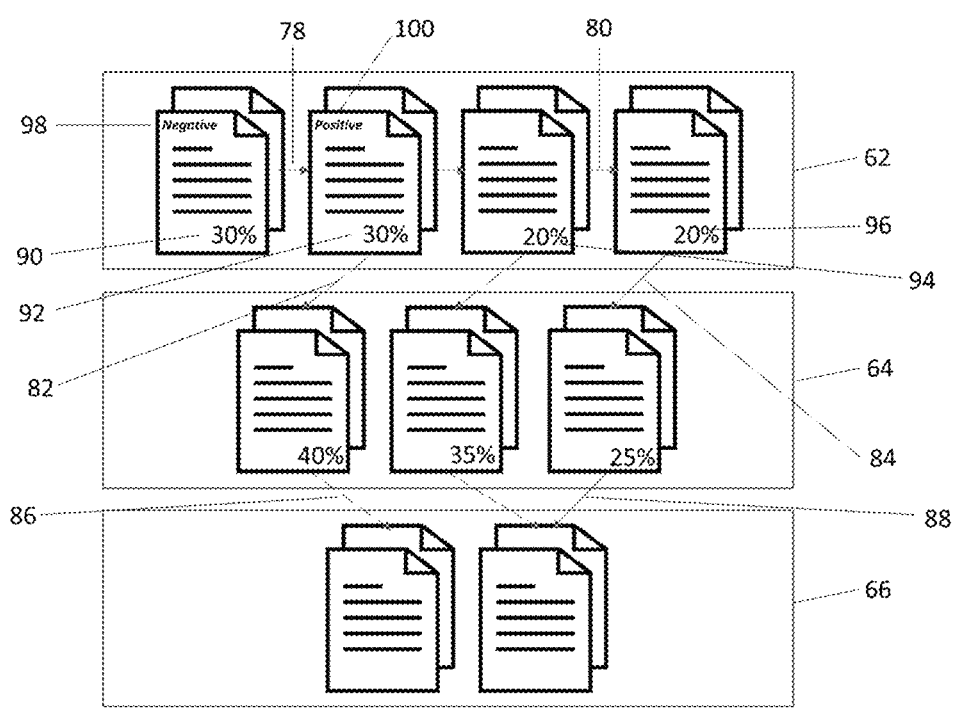
FIG. 5 is a graphical representation of a plurality of pages accessible via the system of the present invention, highlighting how a friction point may be determined in accordance with the present invention.

FIG. 5 is a graphical representation of interactions by a user with the first plurality of pages 62, the second plurality of pages 64, and the third plurality of pages 66. The pages 62, 64, 66 are connected via a first link 78, a second link 80, a third link 82, a fourth link 84, a fifth link 86, and a sixth link 88. These links 78, 80, 82, 84, 86, 88 also are referred to as communication lines 78, 80, 82, 84, 86, 88. The term communication line is intended to encompass a generic connection between the pages 62, 64, 66 and not be limited solely to a link, such as a hyperlink or the like.

FIG. 5 also illustrates a first impact 90 calculated for a first page, a second impact 92 second page, a third impact 94 calculated for the third page, and a fourth impact 96 calculated for the fourth page in first plurality of pages. The impacts 90, 92, 94, 96 associated pages indicates the relative importance of pages in funnel stage. As illustrated, the total of all of the impacts 90, 92, 94, 96 equals 100%. When a data value is referred to herein as an impact data, the term "impact" is intended to refer to the value, i.e., 30%.

FIG. 5 also shows a direction of first page 98 towards the conversion. The second algorithm calculates the direction for each page in funnel stage.

It is contemplated that the first AI algorithm calculates the impact data 90, 92, 94, 96. The second AI algorithm is contemplated to calculate the direction for each webpage 98, 100. As should be apparent to those skilled in the art, the present invention may include more than two AI algorithms without departing from the scope of the present invention.

With continued reference to FIG. 5, it is noted that the first page in first funnel stage is the highest important page and the direction is negative. This means that there could be a friction on this page which is impeding the positive movement for customers. As such, corrective action may need to be taken. One explanation is that there is a failure of data available to the user. For example, the website may not include a picture of the mobile device and, therefore, the user is unable to verify that the selected mobile device is the one that the user wishes to purchase. As should be apparent, there are innumerable reasons for a friction point in the website.

In the embodiment depicted in FIG. 1, the application contains an executable instruction to identify a root cause underlying the anomalies identified in the website. The text data, such as chat transcripts may be assessed by multiple text mining algorithms, including but not limited to K-means Clustering, Naïve Bayes Classifier, K-Nearest Neighbor (KNN), Support Vector Machines (SVM), Decision Tree, Generalized Linear Models (GLM), Neural Networks, Associations Rules, Generic Algorithms, and Latent Dirichlet Allocation, to narrow down the root cause of the friction.

In the embodiment depicted in FIG. 1, The output of the AI models including the top pages or links which have negative impact and have highest impact on conversion along with the root cause is disclosed on a management dashboard.

In the context provided above and the claims appended hereto, the system 10 of the present invention is now described in connection with one or more embodiments thereof.

Figure 6:
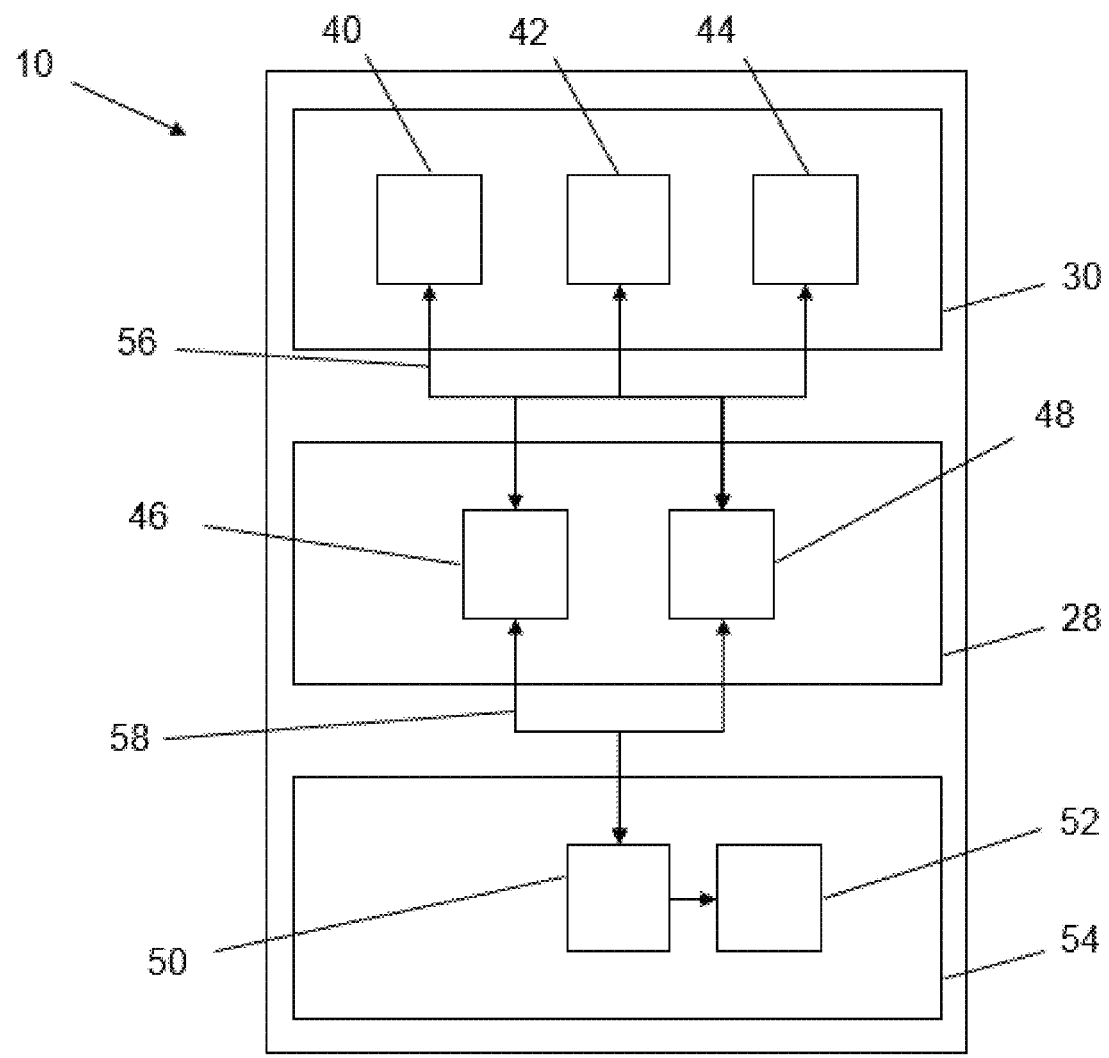
FIG. 6 is a graphical representation of one contemplated structure for the website illustrated in FIG. 1.

In the embodiment depicted in FIG. 6, the system 10 is situated at the backend of a website that is accessible by a user. A database server 30 has access to the website data source. The database server 30 stores various types of data including a text data 40 encompassing a content of a plurality of pages 62, 64, 66 made available via the website 12. The database server 30 also stores a hierarchy data 44 that encompasses a hierarchy 60 organizing the plurality of pages 62, 64, 66 from a first layer 68 to a final layer 72. Still further, the database server 30 stores a web usage data 42 that encompasses a direction of travel by the user through the hierarchy 60 between the first layer 68 and the final layer 72. The direction of travel concerns movement of the user from one layer 68, 70, 72 to the next.

The system 10 also includes a processor 28 connectible to the website 12. The processor 28 executes a first algorithm 46 that calculates an impact data reflecting an impact 90, 92, 94, 96 of each page of the plurality of pages 62, 64, 66 from at least one of the first data 40 and the second data 42. The processor 28 also executes a second algorithm 48 that calculates a probability data reflecting a probability 98, 100, 102, 104, 106, 108 of the user transitioning between the first layer 68 and the final layer 72 using at least one of the second data 44 and the third data 46. Still further the processor 28 executes a third algorithm 50 that analyzes text data to identify the root cause for the friction, as the output 52, from the impact data and the probability data.

The system 10 of the present invention also is contemplated to include a management dashboard 54 to display the friction data.

It is contemplated that the website 12 is accessible by the user via at least one of a mobile device 20 or a computer terminal 16, among other devices.

While not contemplated to be limited to the sale of products, the website 12 may present a plurality of products for sale to the user.

In another contemplated embodiment, the text data 40, the web usage data 42, and the hierarchy data 44 are stored by the database server 30 in a database.

Figure 7:
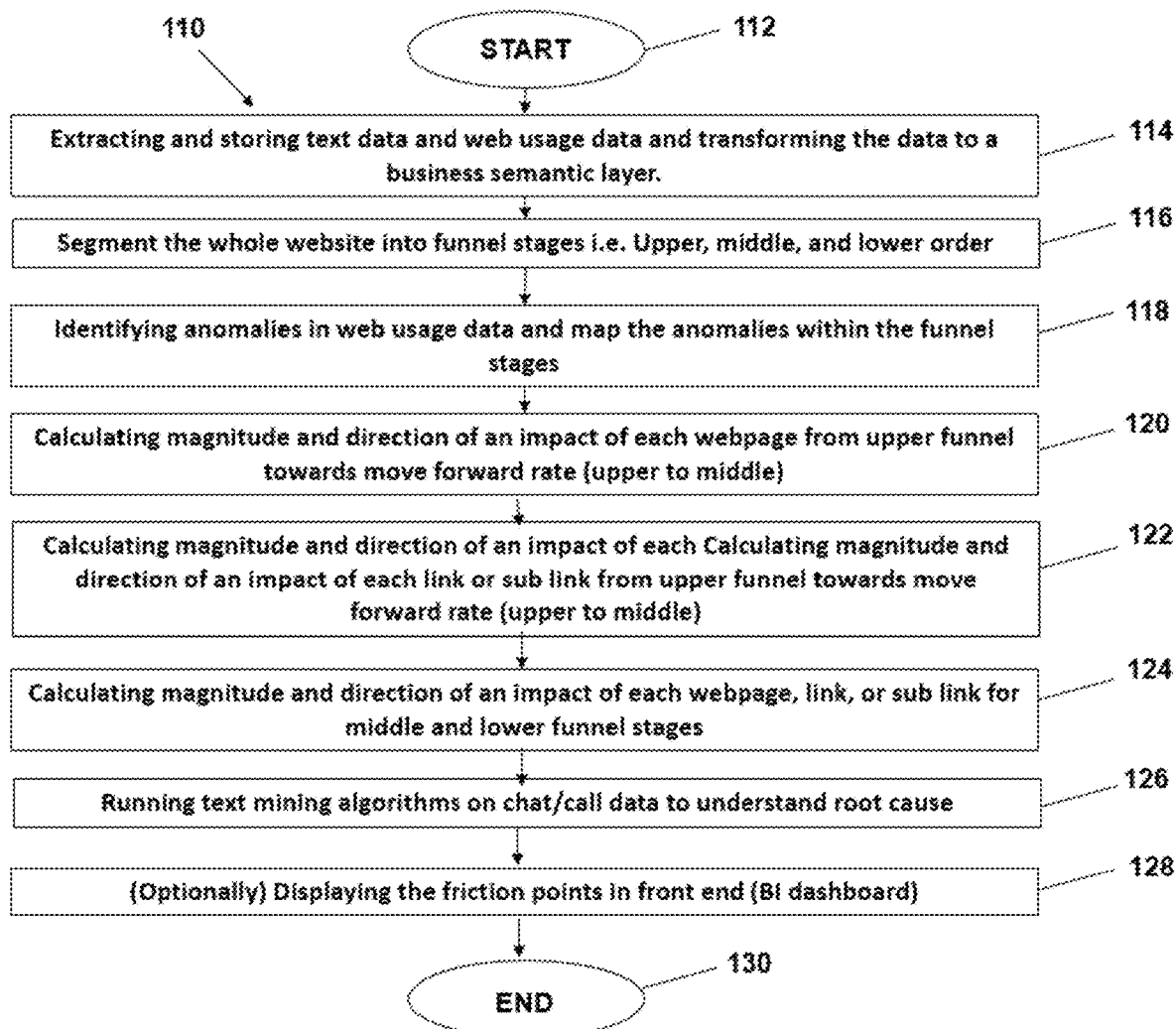
FIG. 7 is a flow chart illustrating one contemplated embodiment of a method according to the present invention.

FIG. 7 illustrates one contemplated method 110 according to the present invention.

The method 110 starts at step 112.

At step 114, a database server 30 extracts and stores the text data 40 encompassing a content of a plurality of pages 62, 64, 66 made available via the website 12. The database server 30 also extracts and stores a web usage data 42, encompassing a direction of travel by the user through the hierarchy 60 between the first layer 68 and the final layer 72 also is stored in the database server 30.

At step 116, the processor 28 executes an instruction to segment the whole website into funnel stages and generate a hierarchy data 44 encompassing the hierarchy 60 organizing the plurality of pages 62, 64, 66 from the upper stage 68, middle stage 70 to the lower stage 72.

At step 118, the processor 28 identifies anomalies in web usage data and maps the anomalies within the funnel stages.

At step 120, the processor 28 executes the AI algorithm 46 and 48 to calculate magnitude and direction of an impact 90, 92, 94, 96 of each webpage of the plurality of pages 62, from upper funnel stage towards middle stage using at least one of the first data 40, the second data 42 and the third data 44.

At step 122, the processor 28 executes the AI algorithms 46 and 48 to calculate magnitude and direction of an impact 98, 100 of each link or sub link 78, 80, 82, 84 the user transitioning between the upper funnel stage and middle stage using at least one of the first data 40, the second data 42 and the third data 44.

At step 124, the processor 28 executes both the first and second algorithms to calculate magnitude and direction of an impact of each webpage, link, or sub link for middle and lower funnel stages.

At step 126, the processor 28 executes test mining algorithms 50 on chat/call transcripts to understand root cause.

At step 128, the processor 28 optionally displays the friction data via a management dashboard 54.

The method 110 ends at step 130.

The above description is meant to be exemplary only, and those skilled in the art will recognize that changes may be made to the embodiments without departing from the scope of the present invention. Variations and equivalents to one or more aspects of the invention may employed without departing from the teachings of the present disclosure. Moreover, the present disclosure may be embodied in other specific forms without departing from the subject matter of the claims. Modifications, variations, and equivalents that fall within the scope of the present invention, as should be apparent to those skilled in the art, are intended to fall within the scope of the claims. Also, the scope of the claims is not intended to be limited by the embodiments set forth herein. Instead, the scope of the claims is intended to be given the broadest interpretation consistent with the description as a whole.

The invention claimed is:

1. A system for identifying friction in a website having a plurality of webpages and links connecting the webpages, comprising:
    a non-transitory computer readable storage device having stored thereon:
    a first instruction executable by a database server to collect text data and web usage data from the website by logfile analysis or page tagging techniques, and to extract semantic features of each webpage from the text data and web usage data using natural language processing algorithms to develop a semantic layer, wherein the semantic layer organizes the semantic features into classes and subclasses based on business terms or business objects, and wherein the semantic layer is implemented by a data platform;
    a second instruction executable by a processor to segment the webpages into a plurality of funnel stages using rule-based heuristics to generate a hierarchy data of the webpages, wherein each funnel stage contains a group of webpages based on a stage in a direction of conversion from informational pages to final pages to complete a transaction;
    a third instruction executable by a processor to detect an anomaly in the web usage data and map the anomaly within the funnel stages, wherein periodic web usage data over a period of time are collected and statistically assessed to identify historical norms and statistical deviation, and wherein the anomaly of most recent web usage data is identified by comparing the most recent web usage data with the historical norms and statistical deviation of the periodic web usage data;
    a fourth instruction executable by a processor to calculate magnitude and direction of a relative impact of each webpage at a first funnel stage of the plurality of funnel stages towards a second funnel stage of the plurality of funnel stages immediately following the first funnel stage in the direction of conversion via artificial intelligence models based on the extracted semantic features of the webpages within each funnel stage, wherein the artificial intelligence models comprise a first algorithm configured to identify which webpage from each funnel stage drives positive or negative impact on conversion and a second algorithm configured to quantify the relative impact of each webpage towards conversion, wherein for each funnel stage the relative impacts of webpages contained in that funnel stage add up to 100%, wherein the artificial intelligence models are trained with labelled text data and web usage data, wherein the artificial intelligence models use text data and web usage data in the semantic layer as input, and wherein the artificial intelligence models comprise Logistic algorithms to calculate the directions and Random forest algorithms to calculate the relative impacts;

a fifth instruction executable by a processor to calculate magnitude and direction of a relative impact of each link clicked for each webpage at each funnel stage towards the next funnel stage in the direction of conversion via artificial intelligence algorithms based on the web usage data and the hierarchy data of the webpages at each funnel stage, wherein the artificial intelligence algorithms comprise the first algorithm configured to identify which link from each funnel stage drives positive or negative impact on conversion and the second algorithm configured to quantify relative impact of each link towards conversion;

a sixth instruction executable by a processor to calculate magnitude and direction of a relative impact of each sub link clicked for each webpage at each funnel stage towards the next funnel stage in the direction of conversion via artificial intelligence algorithms based on the web usage data and the hierarchy data of the webpages at each funnel stage, wherein the artificial intelligence algorithms comprise the first algorithm configured to identify which sub link from each funnel stage drives positive or negative impact on conversion and the second algorithm configured to quantify relative impact of each sub link towards conversion; and a seventh instruction executable by a processor to identify a root cause underlying the anomaly via text mining algorithms based on the text data.

2. The system of claim 1, wherein the computer readable storage device further has stored thereon:

an eighth instruction executable by a processor to display the friction in a management dashboard.

3. The system of claim 1, wherein the funnel stages comprise an upper stage, a middle stage, and a lower stage.

4. The system of claim 1, wherein the text data comprise chat transcripts and call transcripts.

5. The system of claim 1, wherein the web usage data comprise page visited, number of page views, number of unique users, browser and operating system information, user's website view pattern, viewed pages, clicked links, time of interactions, and user characteristics.

6. The system of claim 1, wherein the text data is extracted using natural language processing (NLP) algorithms.

7. The system of claim 1, wherein the third algorithm to identify a root cause underlying the anomaly comprises text mining algorithms selected from a group consisting of K-means Clustering, Naïve Bayes Classifier, K-Nearest Neighbor (KNN), Support Vector Machines (SVM), Decision Tree, Generalized Linear Models (GLM), Neural Networks, Associations Rules, Generic Algorithms, and Latent Dirichlet Allocation.

8. A method for identifying friction in a website having a plurality of webpages and links between the webpages, comprising:

collecting, via a database server, text data and web usage data from the website by logfile analysis or page tagging techniques, and extracting semantic features of each webpage from the text data and web usage data using natural language processing algorithms to develop a semantic layer, wherein the semantic layer organizes the semantic features into classes and subclasses based on business terms or business objects, and wherein the semantic layer is implemented by a data platform;

segmenting, via a processor, the webpages into a plurality of funnel stages using rule-based heuristics to generate a hierarchy data of the webpages, wherein each funnel stage contains a group of webpages based on a stage in a direction of conversion from informational pages to final pages to complete a transaction;

detecting, via a processor, an anomaly in the web usage data and mapping the anomaly within the funnel stages, wherein periodic web usage data over a period of time are collected and statistically assessed to identify historical norms and statistical deviation, wherein the anomaly of most recent web usage data is identified by comparing the most recent web usage data with the historical norms and statistical deviation of the periodic web usage data;

calculating, via a processor, magnitude and direction of a relative impact of each webpage at a first funnel stage of the plurality of funnel stages towards a second funnel stage of the plurality of funnel stages immediately following the first funnel stage in the direction of conversion via artificial intelligence models based on the extracted semantic features of the webpages within each funnel stage, wherein the artificial intelligence models comprise a first algorithm configured to identify which webpage from each funnel stage drives positive or negative impact on conversion and a second algorithm configured to quantify the relative impact of each webpage towards conversion, wherein for each funnel stage the relative impacts of webpages contained in that funnel stage add up to 100%, wherein the artificial intelligence models are trained with labelled text data and web usage data, wherein the artificial intelligence models use text data and web usage data in the semantic layer as input, and wherein the artificial intelligence models comprise Logistic algorithms to calculate the directions and Random forest algorithms to calculate the relative impacts;

calculating, via a processor, magnitude and direction of a relative impact of each link clicked for each webpage at each funnel stage towards the next funnel stage in the direction of conversion via artificial intelligence algorithms based on the extracted semantic features of the webpages within each funnel stage, wherein the artificial intelligence models comprise the first algorithm configured to identify which link from each funnel stage drives positive or negative impact on conversion and the second algorithm configured to quantify relative impact of each link towards conversion;

calculating, via a processor, magnitude and direction of a relative impact of each sub link clicked for each webpage at each funnel stage towards the next funnel stage in the direction of conversion via artificial intelligence algorithms based on the web usage data and the hierarchy data of the webpages at each funnel stage, wherein the artificial intelligence algorithms comprise the first algorithm configured to identify which sub link from each funnel stage drives positive or negative impact on conversion and the second algorithm configured to quantify relative impact of each sub link towards conversion; and running, via a processor, a third algorithm to identify a root cause underlying the anomaly via text mining algorithms based on the text data.

9. The method of claim 8, further comprising displaying the friction in a management dashboard.

10. The method of claim 8, wherein the funnel stages comprise an upper stage, a middle stage, and a lower stage.

11. The method of claim 8, wherein the text data comprise chat transcripts and call transcripts.

12. The method of claim 8, wherein the web usage data comprise page visited, number of page views, number of unique users, browser and operating system information, user's website view pattern, viewed pages, clicked links, time of interactions, and user characteristics.

13. The method of claim 8, wherein the text data is extracted using natural language processing (NLP) algorithms.

14. The method of claim 8, wherein the third algorithm to identify a root cause underlying the anomaly comprises text mining algorithms selected from a group consisting of K-means Clustering, Naïve Bayes Classifier, K-Nearest Neighbor (KNN), Support Vector Machines (SVM), Decision Tree, Generalized Linear Models (GLM), Neural Networks, Associations Rules, Generic Algorithms, and Latent Dirichlet Allocation.

* * * * *